United States Patent
Ku et al.

(10) Patent No.: US 8,443,291 B2
(45) Date of Patent: May 14, 2013

(54) APPARATUS AND METHOD FOR CREATING WIDGET IN PORTABLE TERMINAL

(75) Inventors: Jeong-Hoe Ku, Yongin-si (KR); Jong-Chul Park, Seoul (KR); Ji-Won Ha, Seoul (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 594 days.

(21) Appl. No.: 12/655,381

(22) Filed: Dec. 30, 2009

(65) Prior Publication Data

US 2010/0169806 A1    Jul. 1, 2010

(30) Foreign Application Priority Data

Dec. 30, 2008    (KR) .................. 10-2008-0136305

(51) Int. Cl.
*G06F 3/00*   (2006.01)
*G06F 9/44*   (2006.01)

(52) U.S. Cl.
USPC ............ 715/762; 715/764; 717/406; 719/328

(58) Field of Classification Search .............. 715/762, 715/764; 717/106; 719/328; 709/218, 219
See application file for complete search history.

(56) References Cited

U.S. PATENT DOCUMENTS

| | | | |
|---|---|---|---|
| 8,104,044 B1 * | 1/2012 | Scofield et al. ............... | 719/313 |
| 2002/0180783 A1 * | 12/2002 | Broussard ...................... | 345/744 |
| 2003/0067485 A1 * | 4/2003 | Wong et al. ................... | 345/747 |
| 2006/0005207 A1 * | 1/2006 | Louch et al. .................. | 719/328 |
| 2006/0206861 A1 * | 9/2006 | Shenfield et al. ............. | 717/106 |
| 2007/0150617 A1 * | 6/2007 | Hariki ........................... | 709/246 |
| 2008/0294575 A1 * | 11/2008 | Jung ............................. | 705/400 |
| 2008/0307385 A1 * | 12/2008 | Dreiling et al. ............... | 717/108 |
| 2009/0024944 A1 * | 1/2009 | Louch et al. .................. | 715/765 |
| 2009/0216634 A1 * | 8/2009 | Peltonen et al. ............... | 705/14 |
| 2010/0114729 A1 * | 5/2010 | Chu ............................... | 705/26 |
| 2010/0115438 A1 * | 5/2010 | Chu ............................... | 715/764 |
| 2010/0138778 A1 * | 6/2010 | Dewan et al. ................. | 715/789 |

* cited by examiner

*Primary Examiner* — Tadeese Hailu

(57) ABSTRACT

Provided are an apparatus and a method for creating a widget of a portable terminal. The method includes: determining a building block that a user selects on a widget creating screen including building blocks necessary for widget creation; generating a tag of data corresponding to the confirmed building block; and generating a widget code including the building block and the tag.

20 Claims, 5 Drawing Sheets

APPARATUS AND METHOD FOR CREATING WIDGET IN PORTABLE TERMINAL

CROSS-REFERENCE TO RELATED APPLICATION(S) AND CLAIM OF PRIORITY

The present application is related to and claims priority under 35 U.S.C. §119 of a Korean patent application filed in the Korean Intellectual Property Office on Dec. 30, 2008 and assigned Serial No. 10-2008-0136305, the entire disclosure of which is hereby incorporated by reference.

TECHNICAL FIELD OF THE INVENTION

The present invention relates generally to an apparatus and a method for creating a widget in a portable terminal. More particularly, the present invention relates to an apparatus and a method for directly creating a widget format that a user wants.

BACKGROUND OF THE INVENTION

That is, the present invention provides an apparatus and a method for allowing a common user to create a widget without difficulties, which typically only can be created by a widget specialized software company or a professional developer.

Recently, as portable terminals have been drastically developed, they are being used by men and women of all ages as necessities and also are used as media for wireless voice communication and information exchange.

At the beginning, portable terminals were recognized as tools for just wireless voice communication, but as their technologies are developed, service providers and portable terminal manufacturers have competitively developed products (or services) in order to distinguish them from others.

For example, the portable terminals are being developed as multimedia devices capable of providing different functions such as a phone book, short message service (SMS), E-mail, morning call, an MP3 player, scheduling, a digital camera, and wireless internet service, so that a variety of services can be provided.

In addition, as web 2.0 technology has been extensively used in the portable terminals, a certain widget of a personal computer for providing an additional function is being applied to the portable terminals.

The widget is a service provided from a mobile communication provider and is used to organize a screen of a portable terminal. For example, a dog may run around or a weather forecast may be checked in advance through a downloaded weather widget on the screen of the portable terminal.

In relation to the widget, a user needs to complete a simple widget resource disposition through a basic resource editor, and also needs to directly code eXtensible Markup Language (XML) and java script. However, this method makes utilizing a widget difficult for a user who has no coding experience. That is, the widget is typically created by widget specialized software companies such as portals.

Additionally, the widget only has a limited available service such as displaying of information set by a user and providing an application shortcut function and information of the portable terminal. Accordingly, when a user of the portable terminal wants to display information using a user preference applied setting value, the information is displayed through setting information (e.g., fonts fixed by a widget), which is set during creating of the widget and not by user preference of the portable terminal.

Accordingly, in order to resolve the above limitation, an apparatus and a method allowing a user to create a widget to which user preference is applied without difficulties are required.

SUMMARY OF THE INVENTION

To address the above-discussed deficiencies of the prior art, it is a primary aspect of the present invention to solve at least the above problems and/or disadvantages and to provide at least the advantages below. Accordingly, an object of the present invention is to provide an apparatus and a method for creating a widget in a portable terminal.

Another aspect of the present invention is to provide an apparatus and a method for applying user preference when a widget is created in a portable terminal.

Yet another aspect of the present invention is to provide an apparatus and a method for creating a widget in a portable terminal through a drag and drop method by a user.

In accordance with an aspect of the present invention, an apparatus for creating a widget of a portable terminal includes a widget creating unit generating a tag of data corresponding to a building block that a user selects on a widget creating screen that includes building blocks necessary for widget creation.

In accordance with another aspect of the present invention, a method for creating a widget of a portable terminal includes determining a building block that a user selects on a widget creating screen including building blocks necessary for widget creation, generating a tag of data corresponding to the determined building block; and generating a widget code including the building block and the tag.

Before undertaking the DETAILED DESCRIPTION OF THE INVENTION below, it may be advantageous to set forth definitions of certain words and phrases used throughout this patent document: the terms "include" and "comprise," as well as derivatives thereof, mean inclusion without limitation; the term "or," is inclusive, meaning and/or; the phrases "associated with" and "associated therewith," as well as derivatives thereof, may mean to include, be included within, interconnect with, contain, be contained within, connect to or with, couple to or with, be communicable with, cooperate with, interleave, juxtapose, be proximate to, be bound to or with, have, have a property of, or the like. Definitions for certain words and phrases are provided throughout this patent document, those of ordinary skill in the art should understand that in many, if not most instances, such definitions apply to prior, as well as future uses of such defined words and phrases.

BRIEF DESCRIPTION OF THE DRAWINGS

For a more complete understanding of the present disclosure and its advantages, reference is now made to the following description taken in conjunction with the accompanying drawings, in which like reference numerals represent like parts.

Throughout the drawings, like reference numerals will be understood to refer to like parts, components and structures.

DETAILED DESCRIPTION OF THE INVENTION

FIGS. 1 through 5, discussed below, and the various embodiments used to describe the principles of the present disclosure in this patent document are by way of illustration only and should not be construed in any way to limit the scope of the disclosure.

Hereafter, an apparatus and a method for creating a widget of a portable terminal to which user preference is directly applied will be described according to the present invention.

Figure 1:
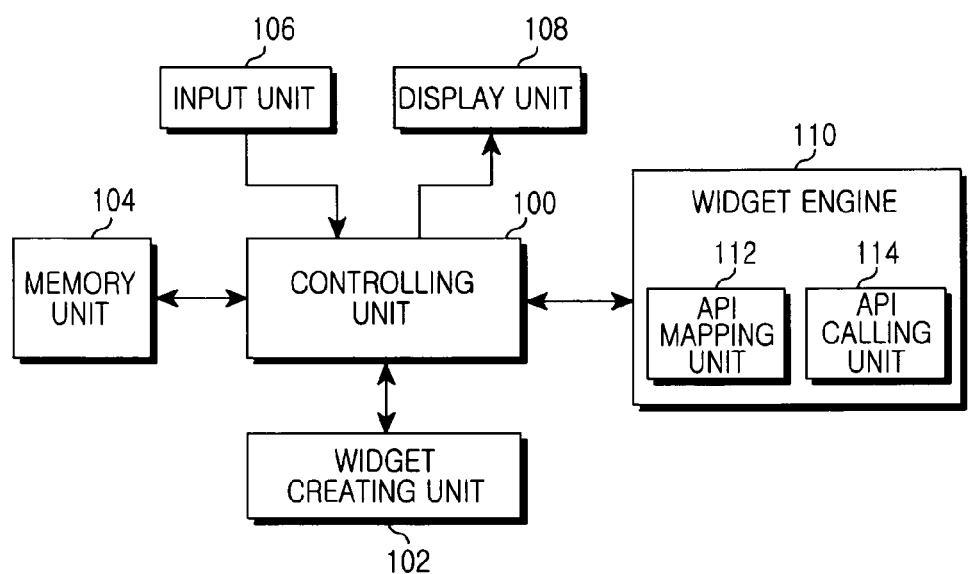
FIG. 1 illustrates a block diagram of a configuration of a portable terminal capable of creating a widget according to one embodiment of the present invention.

FIG. 1 illustrates a block diagram of a configuration of a portable terminal capable of creating a widget according to one embodiment of the present invention.

FIG. 1, the portable terminal includes a controlling unit 100, a widget creating unit 102, a memory unit 104, an input unit 106, a display unit 108, and a widget engine 110. The widget engine 110 may include an Application Programming Interface (API) mapping unit 112 and an API calling unit 114.

The controlling unit 100 of the portable terminal performs the overall operations of the portable terminal, for example, processing and controlling operations for voice and data communications. The widget creating unit 102 allows a user to directly create a desired widget.

In more detail, when a user of the portable terminal creates a widget, the controlling unit 100 instructs the widget creating unit 102 to display a widget creating screen for outputting data necessary for widget creation, such that a user can create a widget.

Next, the controlling unit 100 determines a building block that a user selects among building blocks that constitute a widget that a user of the portable terminal creates and also determines property information such as font types and font sizes constituting a widget.

Accordingly, the controlling unit 100 creates a widget by generating widget codes that include tags for property information to which user personality is applied in a corresponding building block. The widget code means a code that can request data related to a corresponding building block.

The widget creating unit 102 receives an instruction from the controlling unit 100 and outputs a widget creating screen in order to allow a user to directly create a widget. At this point, a user of the portable terminal creates a widget by selecting items necessary for creating the widget from the widget creating screen through a drag and drop method.

The memory unit 104 includes ROM, RAM, and flash ROM. The ROM stores micro codes of a program and various reference data for processing and controlling the controlling unit 100.

The RAM is a working memory of the controlling unit 100 for storing temporary data generated during various program executions. Additionally, the flash ROM stores various updatable data for archive such as a phone book, sent messages and received messages.

The input unit 106 includes a plurality of function keys such as 0 to 9 number key buttons, a menu button, a cancel button (or, a delete button), a OK button, a call button, an end button, an internet connection button, navigation key (or, a direction key) buttons, and letter input key buttons, and also provides key inputted data (e.g., a widget creating request) corresponding to a user pressed key to the controlling unit 100. Additionally, the input unit 106 includes a touch input unit for sensing a touch input and senses a touch input of a user and then, provides the sensed touch input to the controlling unit 100.

The display unit 108 displays state information generated during an operation of the portable terminal, the limited number of letters, and a plurality of moving or still pictures. The display unit 108 uses a color Liquid Crystal Display (LCD) device.

The widget engine 110, as mentioned above, includes an API mapping unit 112 and an API calling unit 114, and drives widgets created by the widget creating unit 102.

When the widget engine 110 senses a request for executing a widget created by a user, it processes the request by mapping an Original Equipment Manufacturer (OEM) API corresponding to the request to call a corresponding OEM API.

The API mapping unit 112 of the widget engine 110 maps an instruction for a widget executing method (e.g., a phone book searching method) into the OEM API (i.e., API corresponding to a mapping widget execution) and then delivers it to the API calling unit 114. Accordingly, the API calling unit 114 calls the OEM API that controls phone book information, that is, an internal function of the portable terminal. Next, the API calling unit 114 generates a calling result of the OEM API and then delivers it to the API mapping unit 112, and the API mapping unit 112 provides data that a user requests using the calling result delivered from the API calling unit 114.

That is, the API mapping unit 112 manages data necessary for widget creation as eXtensible Markup Language (XML) tags, and links them with a corresponding API.

Although the role of the widget creating unit 102 may be performed herein by the controlling unit 100 of the portable terminal, its configuration and operations are just one example for convenience of description and are not intended to limit the scope of the present invention. It is apparent to those skilled in the art that various modifications are possible within the scope of the present invention. For example, all of these may be configured to be processed in the controlling unit 100.

The above is described with respect to an apparatus for creating a widget of a portable terminal to which user preference is directly applied according to the present invention, and a method for creating a widget to which user preference is directly applied to using the above apparatus according to one embodiment of the present invention will be described.

Figure 2:
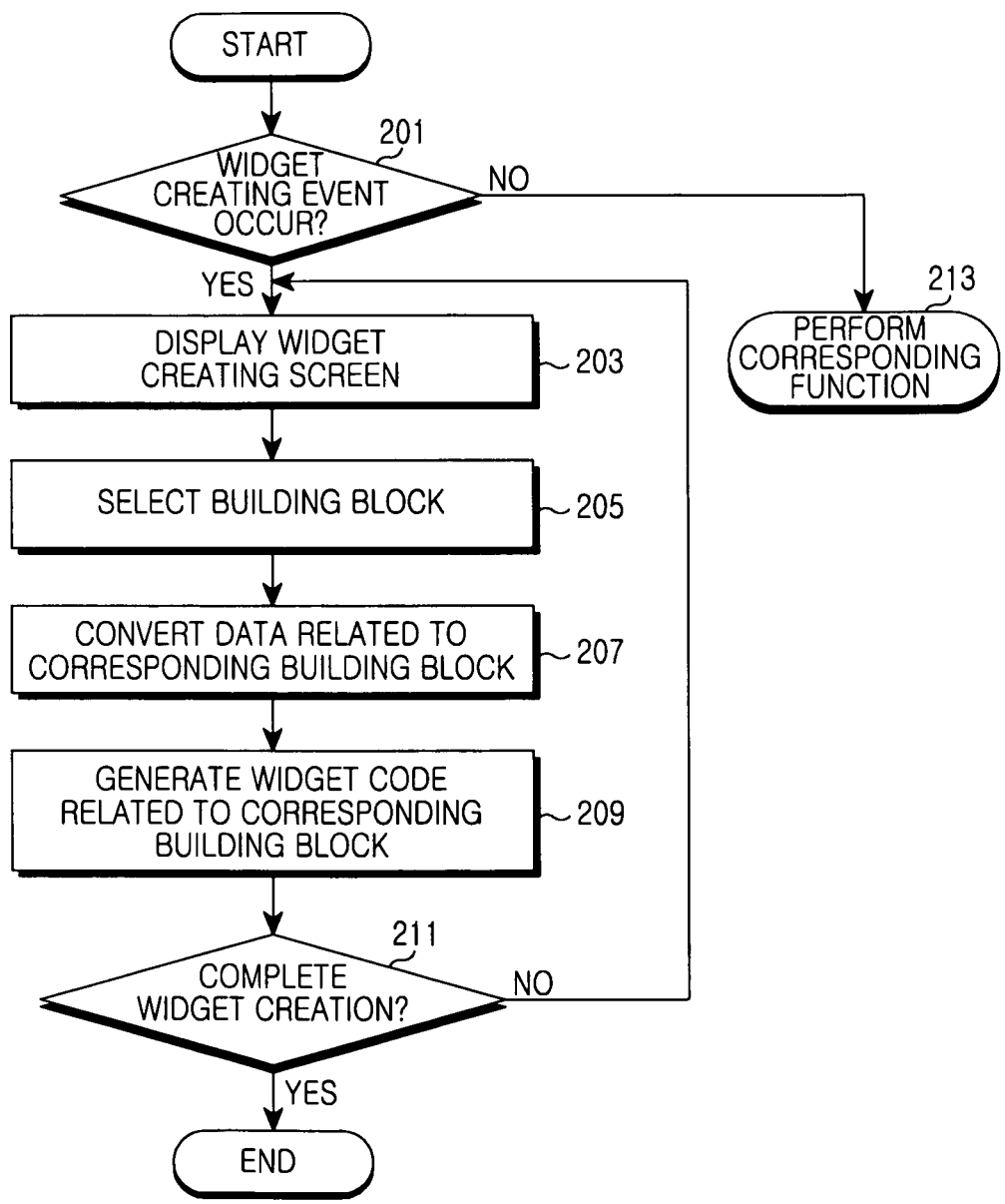
FIG. 2 illustrates a flowchart of a widget creating process of a portable terminal according to one embodiment of the present invention.

FIG. 2 illustrates a flowchart of a widget creating process of a portable terminal according to one embodiment of the present invention.

Referring to FIG. 2, the portable terminal determines whether a widget creating event occurs or not in step 201. Here, the widget creating event is an event for directly creating a widget by a user of the portable terminal.

If the widget creating event does not occur in step 201, the portable terminal proceeds to step 213 to perform a corresponding function (e.g., a standby mode).

On the contrary, if the widget creating event occurs in step 201, the portable terminal proceeds to step 203 to display a widget creating screen, and then proceeds to step 205 to select a building block for widget creation.

Here, the widget creating screen is a screen where data necessary for widget creation are outputted to create a widget directly and simply by a user of the portable terminal, i.e., an authorized tool execution screen for widget creation. Additionally, the building block means blocks constituting a widget created by a user of the portable terminal, and includes a weather information block, a schedule managing block, and an address block.

Next, the portable terminal proceeds to step 207 to convert data related to a corresponding building block into one appropriate for widget creation and proceeds to step 209, and then generates a widget code related to a corresponding building block. That is, step 209 is a step for generating a code to request data related to a corresponding building block.

Next, the portable terminal proceeds to step 211 and then determines whether widget creation is completed or not.

If the widget creation is not completed in step 211, the portable terminal proceeds to step 203 and then repeats the above operations until the widget creation is completed. That is, the portable terminal repeats the above operations until all building blocks that a user wants to add to a widget are created.

In addition, if the widget creation is completed in step 211, the portable terminal terminates this algorithm.

Figure 3:
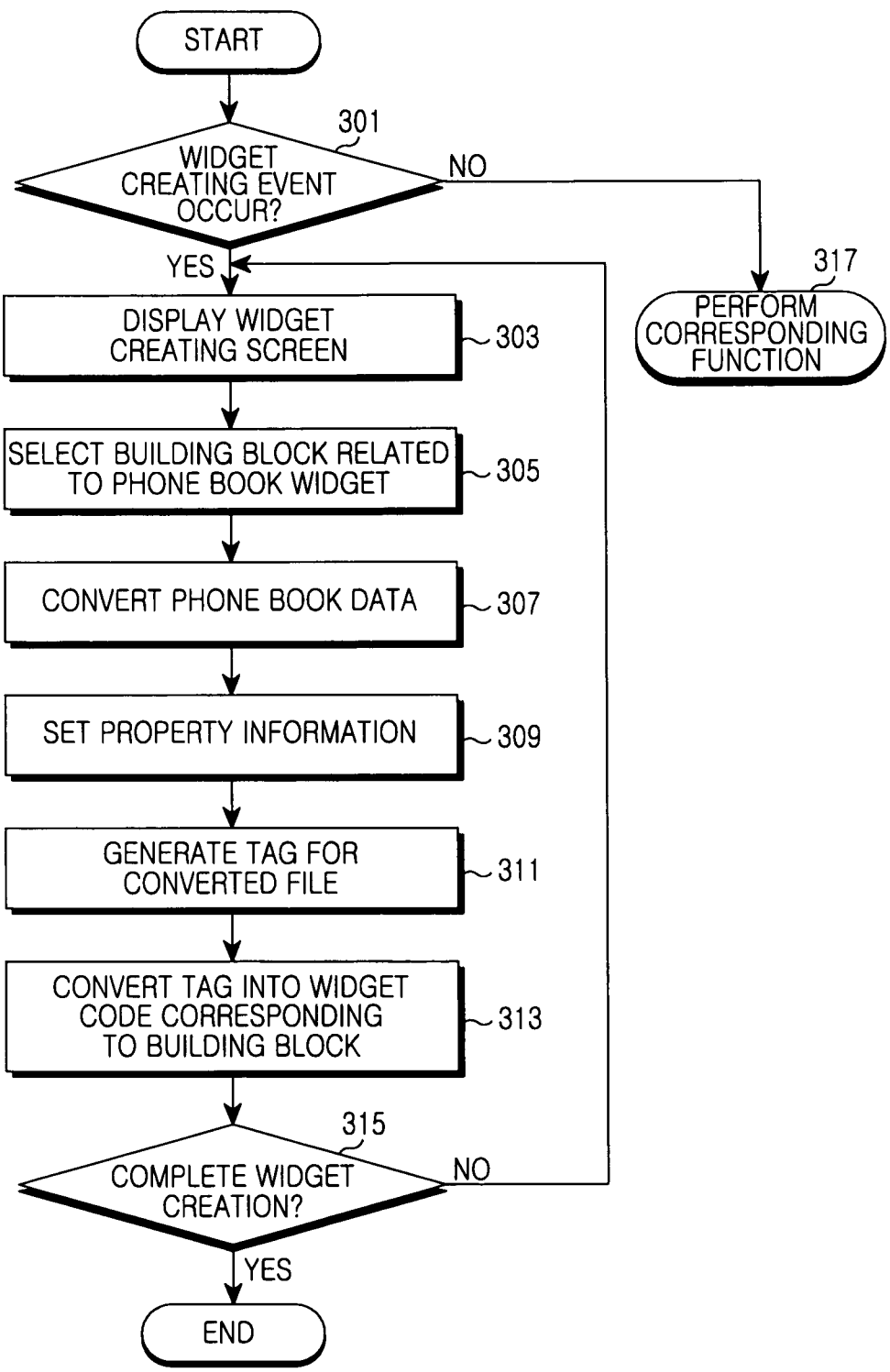
FIG. 3 illustrates a flowchart of a widget that controls phone book data in a portable terminal according to one embodiment of the present invention.

FIG. 3 illustrates a flowchart of a widget that controls phone book data in a portable terminal according to one embodiment of the present invention.

Referring to FIG. 3, the portable terminal determines whether a widget creating event occurs or not in step 301. Here, the widget creating event is an event for creating a widget through which a user of the portable terminal personally manages a phone book.

If the widget creating event does not occur in step 301, the portable terminal proceeds to step 317 to perform a corresponding function (e.g., a standby mode).

Otherwise, if the widget creating event occurs in step 301, the portable terminal proceeds to step 303 to display a widget creating screen, and then proceeds to step 305 to select a building block for widget creation.

Here, the widget creating screen is a screen where data necessary for widget creation are outputted to create a widget directly and simply by a user of the portable terminal, i.e., an authorized tool execution screen for widget generation. Additionally, the building block are blocks constituting a widget created by a user of the portable terminal, and a building block related to a phone book widget includes one block (in which data stored in a phone book are searched by a name) and another block (in which the data stored in a phone book are searched by a number).

Next, the portable terminal proceeds to step 307 and processes to convert phone book data stored in the portable terminal into XML and to link the converted XML with the widget.

Next, the portable terminal proceeds to step 309 to set property information that represents information such as font types and font sizes of a corresponding widget screen according to user preference, and then proceeds to step 311 to generate tags (e.g., search tags for each number, and search tags for each name) for the phone book data converted in step 307. Using the above method, the portable terminal reflects property information on the widget User Interface (UI) such that a widget to which user personality is applied can be used.

Later, the portable terminal proceeds to step 313 to generate widget codes related to a corresponding building block through the tags. That is, step 313 is a step for generating codes for requesting data related to a corresponding building block.

Next, the portable terminal proceeds to step 315 and then determines whether widget creation is completed or not.

If the widget creation is not completed, the portable terminal proceeds to step 303 and then repeats the above steps until the widget creation is completed.

In addition, if the widget creation is completed, the portable terminal terminates this algorithm.

Although operations for creating a widget in the portable terminal are described with reference to FIGS. 2 and 3 according to one embodiment of the present invention, the present invention may be applied to a personal computer in order to create a widget other than a portable terminal and then may allow the portable terminal to download a widget created by the personal computer.

Figure 4:
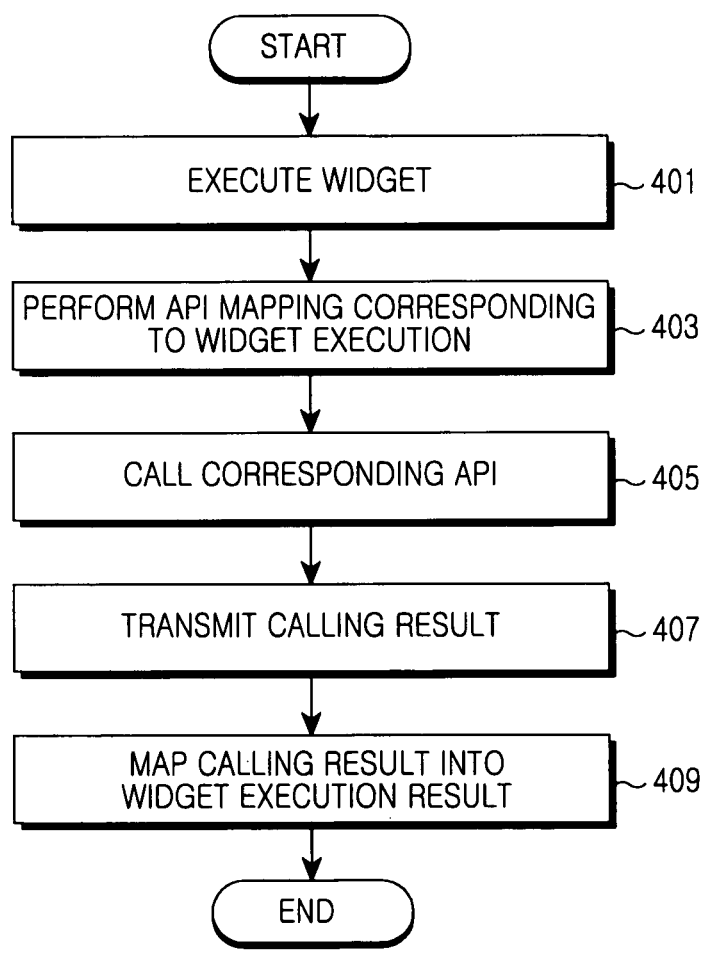
FIG. 4 illustrates a flowchart of a widget operation of a widget engine in a portable terminal according to one embodiment of the present invention.

FIG. 4 illustrates a flowchart of a widget operation of a widget engine in a portable terminal according to one embodiment of the present invention.

Referring to FIG. 4, the portable terminal is in a state in which a widget is created and downloaded, and thus the widget engine proceeds to step 401 first and then, executes the widget. At this point, if it is assumed that the widget is a widget related to a phone book, widget execution may be an operation for searching phone book data. For one example, the widget execution is an operation in which a user of the portable terminal searches phone book data using a name or a phone number through the widget.

Next, the widget engine proceeds to step 403 to allow an API mapping unit to map an instruction for a phone book searching method that a user selects into an OEM API (API corresponding to a mapping widget execution) defined in the widget engine, and then proceeds to step 405 to call a corresponding API using an API calling unit. That is, the API calling unit, which receives an instruction from the controlling unit, calls the OEM API that controls phone book information, that is, an internal function of the portable terminal.

Next, the widget engine proceeds to step 407 to search data for a corresponding method and allows the API calling unit to generate a calling result of the OEM API, and then delivers the calling result to the API mapping unit.

Accordingly, the widget engine proceeds to step 409 and allows the API mapping unit to provide data that a user requests using the calling result delivered from the API calling unit. That is, the widget engine provides a result about a searching method that a user requests as a widget execution result.

Next, the widget engine terminates this algorithm.

Figure 5:
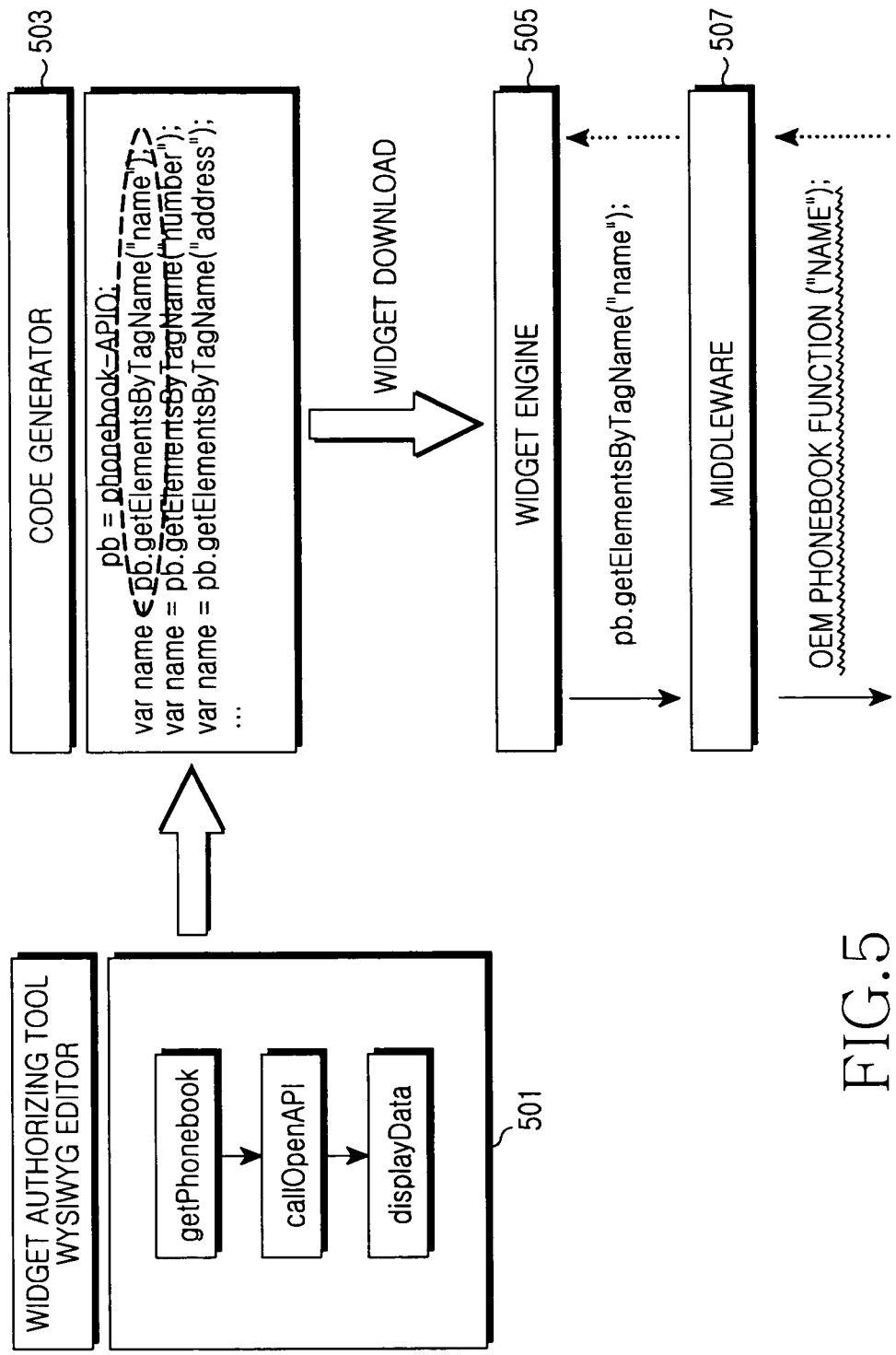
FIG. 5 illustrates a view of that a widget that a user creates operating in a portable terminal according to one embodiment of the present invention.

FIG. 5 illustrates a view of that a widget that a user creates operates in a portable terminal according to one embodiment of the present invention.

As shown in FIG. 5, a widget code 503 generated using OEM API of a widget authorizing tool 501 includes class, XML, tag, DOM, API, etc. defined in the widget engine.

Accordingly, a widget engine of a portable terminal parses a widget class pb for a phone book containing user information, predetermined "name", tag, and a 'getElementsByname' method in step 505 and reads user information of the portable terminal by calling the corresponding OEM API to deliver its result value as a widget method result value in step 507.

As mentioned above, the present invention relates to an apparatus and a method for allowing a common user to create a widget without difficulties, which typically only can be created by a widget specialized software company or a professional developer. In addition, the present invention makes it possible to create a widget of a portable terminal to which user personality is applied such that it can give pleasure to a user of the portable terminal.

While the invention has been shown and described with reference to certain preferred embodiments thereof, it will be understood by those skilled in the art that various changes in form and details may be made therein without departing from the spirit and scope of the invention as defined by the appended claims. Therefore, the scope of the invention is defined not by the detailed description of the invention but by the appended claims, and all differences within the scope will be construed as being included in the present invention.

What is claimed is:

1. An apparatus for creating a widget of a portable terminal, the apparatus comprising:
a widget creating unit configured to:
converting data corresponding to a building block into eXtensible Markup Language (XML), the building block selected by a user on a widget creating screen, the widget creating screen comprising building blocks associated with widget creation;
generate an XML tag associated with the converted data; and
generate a widget code including the selected building block and the XML tag.

2. The apparatus of claim 1, wherein the widget creating unit is configured to set property information that represents a user personality to create a widget of the portable terminal after generating the XML tag.

3. The apparatus of claim 1, wherein, after generating the widget code including the selected building block and the XML tag, the widget creating unit is configured to create a widget including the generated widget code.

4. The apparatus of claim 1, wherein the widget creating unit is configured to determine that a widget creating event has occurred before displaying the widget creating screen.

5. The apparatus of claim 2, wherein the property infoimation that represents the user personality comprises at least one of font types, font sizes, letter colors, and font effects.

6. The apparatus of claim 1, further comprising:
an Application Programming Interface (API) mapping unit configured to map a widget executing method into an Original Equipment Manufacturer (OEM) API defined in a widget engine when operating in the portable terminal; and
an API calling unit configured to call an OEM API configured to control an internal function of the portable terminal using the mapped OEM API.

7. A method for creating a widget of a portable terminal, the method comprising:
determining a building block selected by a user on a widget creating screen, the widget creating screen comprising building blocks associated with widget creation;
converting data corresponding to the determined building block into eXtensible Markup Language (XML);
generating an XML tag associated with the converted data; and
generating a widget code including the determined building block and the XML tag.

8. The method of claim 7, further comprising setting property information that represents a user personality after generating the tag corresponding to the determined block.

9. The method of claim 8, wherein the property information that represents the user personality comprises at least one of font types, font sizes, letter colors, and font effects.

10. The method of claim 7, further comprising, after generating the widget code including the determined building block and the XML tag, creating a widget including the generated widget code.

11. The method of claim 7, further comprising determining that a widget creating event has occurred before displaying the widget creating screen.

12. The method of claim 7, wherein the widget including the widget code maps a widget executing method into an Original Equipment Manufacturer (OEM) Application Programming Interface (API) defined in a widget engine when operating in the portable terminal and operates by calling the OEM API using the mapped OEM API, the OEM API configured to control an internal function of the portable terminal.

13. A method for creating a widget of a portable terminal, the method comprising:
receiving a selection from a widget creating screen of the portable terminal;
determining a building block corresponding to the selection, the building block selected from building blocks associated with a widget creation;
converting data corresponding to the determined building block into eXtensible Markup Language (XML); and
generating an XML tag associated with the converted data.

14. The method of claim 13, further comprising:
generating a widget code including the determined building block and the XML tag.

15. The method of claim 14, further comprising setting property information that represents a user's preference after generating the tag corresponding to the determined block.

16. The method of claim 15, wherein the property information that represents the user's preference comprises at least one of a font type, a font size, letter color, and a font effect.

17. The method of claim 14, further comprising creating a widget including the generated widget code.

18. The method of claim 17, wherein the widget including the widget code maps a widget executing method into an Original Equipment Manufacturer (OEM) Application Programming Interface (API) defined in a widget engine when operating in the portable terminal and operates by calling the OEM API using the mapped OEM API, the OEM API configured to control an internal function of the portable terminal.

19. The method of claim 17, wherein the widget is configured to control phone book data in the portable terminal.

20. The method of claim 14, further comprising determining that a widget creating event has occurred before displaying the widget creating screen.

* * * * *